US012710166B2

(12) United States Patent
Liu et al.

(10) Patent No.: US 12,710,166 B2
(45) Date of Patent: Aug. 18, 2026

(54) MODULAR LIGHT EMITTING DIODE (LED) LAMP DEVICE

(71) Applicant: Wuxi Seastar Lighting Co., Ltd., Wuxi (CN)

(72) Inventors: Yun Liu, Wuxi (CN); Xingchao Dou, Wuxi (CN); Zhihui Huang, Wuxi (CN); Jieping Zeng, Wuxi (CN); Xinrong Sha, Wuxi (CN); Jiyong Liu, Wuxi (CN)

(73) Assignee: Wuxi Seastar Lighting Co., Ltd., Wuxi (CN)

( * ) Notice: Subject to any disclaimer, the term of this patent is extended or adjusted under 35 U.S.C. 154(b) by 0 days.

(21) Appl. No.: 19/272,662

(22) Filed: Jul. 17, 2025

(65) Prior Publication Data

US 2025/0341302 A1 Nov. 6, 2025

(30) Foreign Application Priority Data

May 15, 2025 (CN) ........................ 202520958645.X

(51) Int. Cl.

| | |
|---|---|
| ***F21V 23/02*** | (2006.01) |
| ***F21S 2/00*** | (2016.01) |
| ***F21V 7/04*** | (2006.01) |
| ***F21V 17/06*** | (2006.01) |
| ***F21V 23/00*** | (2015.01) |
| ***F21V 23/04*** | (2006.01) |
| ***F21V 23/06*** | (2006.01) |
| ***F21V 29/76*** | (2015.01) |
| *F21Y 115/10* | (2016.01) |

(52) U.S. Cl.

CPC ............ *F21V 23/023* (2013.01); *F21S 2/005* (2013.01); *F21V 7/041* (2013.01); *F21V 17/06* (2013.01); *F21V 23/002* (2013.01); *F21V 23/04* (2013.01); *F21V 23/06* (2013.01); *F21V 29/763* (2015.01); *F21Y 2115/10* (2016.08)

(58) Field of Classification Search

CPC ........ F21V 23/04; F21V 23/06; F21V 23/002; F21V 17/06; F21V 7/041; F21V 29/763; F21V 23/023; F21S 2/005

See application file for complete search history.

(56) References Cited

U.S. PATENT DOCUMENTS

| | | | | |
|---|---|---|---|---|
| 9,982,855 | B1 * | 5/2018 | Tan | F21V 21/28 |
| 10,066,797 | B1 * | 9/2018 | Tan | F21V 29/502 |
| 11,022,259 | B2 * | 6/2021 | Bailey | F21S 8/024 |
| 11,435,064 | B1 * | 9/2022 | Danesh | F21V 21/04 |

(Continued)

*Primary Examiner* — Christopher E Dunay

(57) ABSTRACT

A modular light emitting diode (LED) lamp device, includes: a lamp holder assembly comprising a heat sink, a lamp panel fixedly connected to the heat sink, a diffusion cover fixed to the heat sink through a pressure ring, a connector bracket mounted on the heat sink, and a wiring terminal provided in the connector bracket; a reflector cup assembly comprising a reflector cup platform for supporting the lamp holder assembly, and a reflector cup rim provided at a top of the reflector cup assembly, where a slot is formed in the reflector cup rim, and the slot is matched with a protrusion; and a power supply assembly, where a power supply module is built in the power supply assembly, a connecting terminal is provided on the power supply module, and the connecting terminal is connected to the wiring terminal.

1 Claim, 8 Drawing Sheets

(56) References Cited

U.S. PATENT DOCUMENTS

| | | | | |
|---|---|---|---|---|
| 2013/0070454 | A1 | 3/2013 | Zeng et al. | |
| 2014/0049957 | A1* | 2/2014 | Goelz | F21V 29/763<br>362/294 |
| 2014/0084800 | A1 | 3/2014 | Lee | |
| 2017/0045213 | A1* | 2/2017 | Williams | F21V 23/06 |
| 2020/0075822 | A1 | 3/2020 | Suich et al. | |
| 2025/0305662 | A1* | 10/2025 | Chen | F21S 8/026 |

* cited by examiner

MODULAR LIGHT EMITTING DIODE (LED) LAMP DEVICE

CROSS-REFERENCE TO RELATED APPLICATIONS

This application claims priority to Chinese Patent Application No. 202520958645.X with a filing date of May 15, 2025. The content of the aforementioned application, including any intervening amendments thereto, is incorporated herein by reference.

TECHNICAL FIELD

The present disclosure relates to the technical field of light emitting diode (LED) lamp production, and in particular to a modular LED lamp device.

BACKGROUND

Modular design of LED lamps has emerged as a dominant trend in the market in recent years. To achieve modular platform integration and offer abundant product combinations with different reflector cup accessories, relevant technical personnel have developed various modular products. However, existing modular products generally have the following problems: the area of contact between the lamp holder and accessories such as the reflector cup is limited after installation, and the heat generated by the lamp holder cannot be effectively transferred to the reflector cup for timely heat dissipation. These problems result in a high temperature in the lamp holder while the reflector cup remains relatively cool during operation, which affects the lifespan of the LED lamp and limits the further expansion of the LED lamp market.

SUMMARY

To solve the above technical problems, the inventors of the present disclosure have developed a modular LED lamp device on the basis of their rich experience in the technical field of LED lamps.

To achieve the above objective, the present disclosure adopts the following technical solutions: the modular LED lamp device includes: a lamp holder assembly, where the lamp holder assembly is provided with a heat sink, a lamp panel is transversely attached inside the heat sink, the lamp panel is fixedly connected to the heat sink through screws, a diffusion cover is connected below the lamp panel, a pressure ring is provided below the diffusion cover, the pressure ring fixes the diffusion cover to the heat sink through screws, a connector bracket is mounted on the heat sink, a wiring terminal is provided in the connector bracket, and a protrusion is provided at a lower part of the heat sink; a reflector cup assembly, where the reflector cup assembly is provided with a reflector cup platform for supporting the lamp holder assembly, the reflector cup platform is closely attached to the lamp holder assembly, a reflector cup rim is provided at a top of the reflector cup assembly, a slot is formed in the reflector cup rim, and the slot is matched with the protrusion; and a power supply assembly, where the power supply assembly is provided with a power supply box, a power supply module is built in the power supply box, a connecting terminal is provided on the power supply module, and the connecting terminal is connected to the wiring terminal.

Furthermore, a hose connector is connected to the connector bracket, a hose is connected to the hose connector, a steel wire rope is connected to the hose, the steel wire rope is fixed to the heat sink through screws, and the wiring terminal is wrapped inside the hose.

Furthermore, an anti-loosening elastic piece is fixedly connected to the heat sink through screws, and the anti-loosening elastic piece is provided with a raised structure for introducing the reflector cup assembly and a bulging structure for fixing the reflector cup assembly.

Furthermore, a spring bracket is connected to the reflector cup rim through a rivet, and a spring is mounted on the spring bracket. The spring bracket is of an arc structure.

Furthermore, a wiring cover is connected to the power supply box through a bayonet, a dual in-line package (DIP) switch cover is provided below the wiring cover, and a DIP switch hole is formed in the DIP switch cover.

Furthermore, a DIP switch is provided on the power supply module, and the DIP switch is exposed outside the DIP switch hole. The DIP switch can change the color temperature and power of the lamp according to requirements.

Furthermore, a plurality of reserve holes for the hose and the wiring terminal to pass through are formed in the power supply box. Due to the complex installation conditions and limited space at the lamp installation site, the inventors have designed a plurality of reserve holes on the power supply box to facilitate the subsequent installation and use of the lamp.

Furthermore, there are at least two slots and at least two protrusions, and the slots and the protrusions are symmetrically arranged.

Compared with the prior art, the present disclosure has the following beneficial effects:

1. This device realizes a modular design for LED lamps, allowing the lamp holder assembly and reflector cup assembly to fit closely together. This increases the contact area between the lamp holder assembly and the reflector cup assembly, effectively utilizing the reflector cup to assist in heat dissipation of the lamp holder. The heat generated by LED lamp beads during operation can be efficiently transferred to the reflector cup, thereby improving the performance of the lamp and extending the lifespan of the lamp.
2. This device incorporates structures such as the anti-loosening elastic piece, the slot, and the protrusion, ensuring that the lamp holder assembly and the reflector cup assembly remain securely in place after installation, thereby enhancing the safety performance of the lamp during use. This device can meet market demands and create significant economic value.

REFERENCE NUMERALS

1. Lamp holder assembly; 101. Screw; 102. Steel wire rope; 103. Connector bracket; 104. Hose connector; 105. Hose; 106. Anti-loosening elastic piece; 1061. Raised structure; 1062. Bulging structure; 107. Heat sink; 108. Lamp panel; 109. Diffusion cover; 110. Pressure ring; 111. Wiring terminal; 112. Protrusion; 2. Reflector cup assembly; 201. Reflector cup platform; 202. Spring bracket; 203. Rivet; 204. Spring; 205. Reflector cup rim; 206. Slot; 3. Power supply assembly; 301. Power supply box; 302. Connecting terminal; 303. Wiring cover; 304. Power supply module; 305. DIP switch; 306. DIP switch cover; 307. DIP switch hole; and 308. Reserve hole.

DETAILED DESCRIPTION OF THE EMBODIMENTS

For ease of understanding on the present disclosure, the present disclosure will be described below in detail in conjunction with the accompanying drawings and specific embodiments. It should be noted that, when a component is fixed to another component, the component may be fixed to the other component directly or via an intermediate component. When a component is connected to another component, the component may be connected to the component directly or indirectly via one or more intermediate components. The terms "vertical", "horizontal", "left", "right", "inside", "outside", and similar expressions used herein are for illustrative purposes only.

Unless otherwise defined, all technical and scientific terms used in the specification have the same meaning as commonly understood by those skilled in the technical field of the present disclosure. The terms used in the specification of the present disclosure are merely for the purpose of describing specific embodiments, rather than to limit the present disclosure. The term "and/or" used herein includes any and all combinations of one or more related items listed.

Similarly, the terms "fix" and "connect" used in the specification and claims should not be understood as limited to direct connections. Therefore, the expression "a device A is connected to a device B" should not be limited to that the device A is directly connected to the device B in the apparatus or system, and instead indicates that there is a pathway between the device A and the device B, that is, the device A is directly or indirectly connected to the device B.

In addition, the technical features involved in the various implementations of the present disclosure described below may be combined with each other as long as they do not constitute a conflict with each other.

Figure 1:
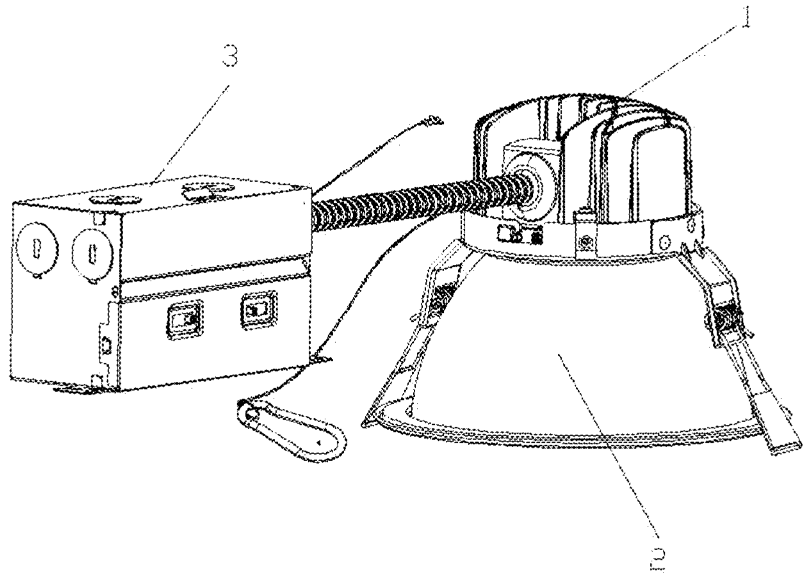
FIG. 1 is an assembly diagram showing a lamp device of the present disclosure.
Figure 2:
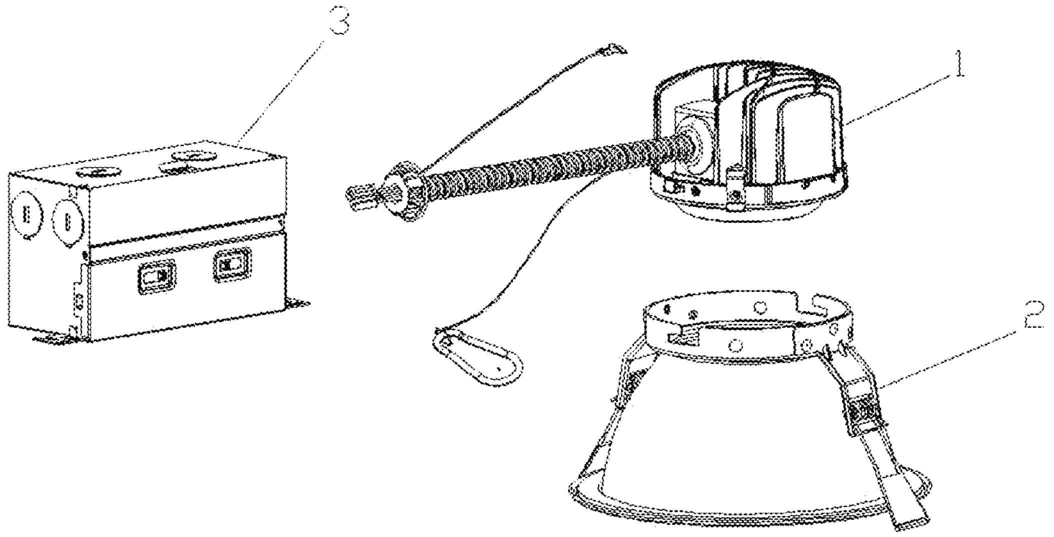
FIG. 2 is an exploded diagram showing the lamp device of the present disclosure.
Figure 3:
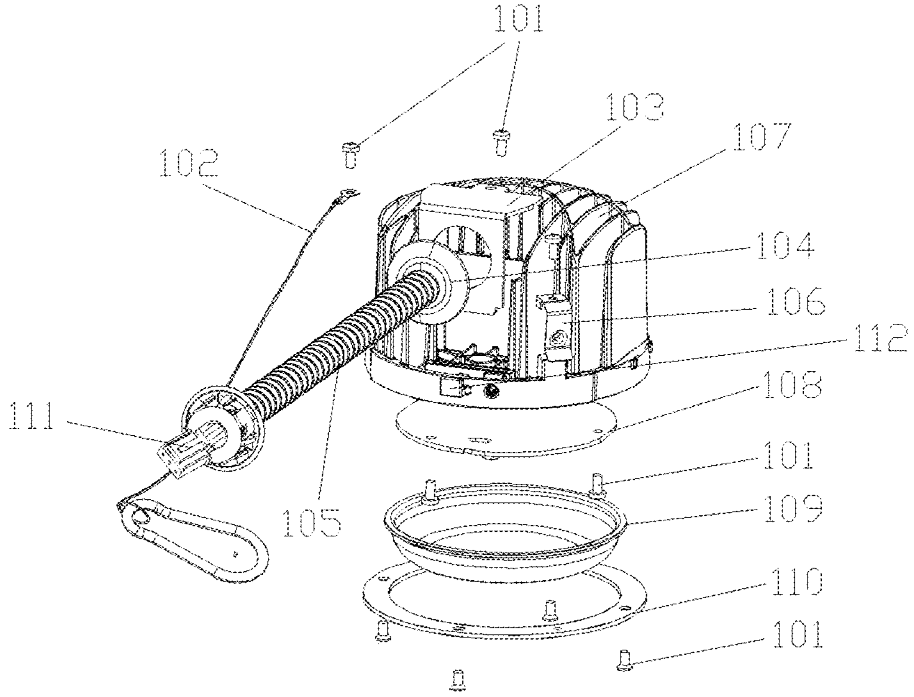
FIG. 3 is an exploded diagram showing a lamp holder assembly.
Figure 4:
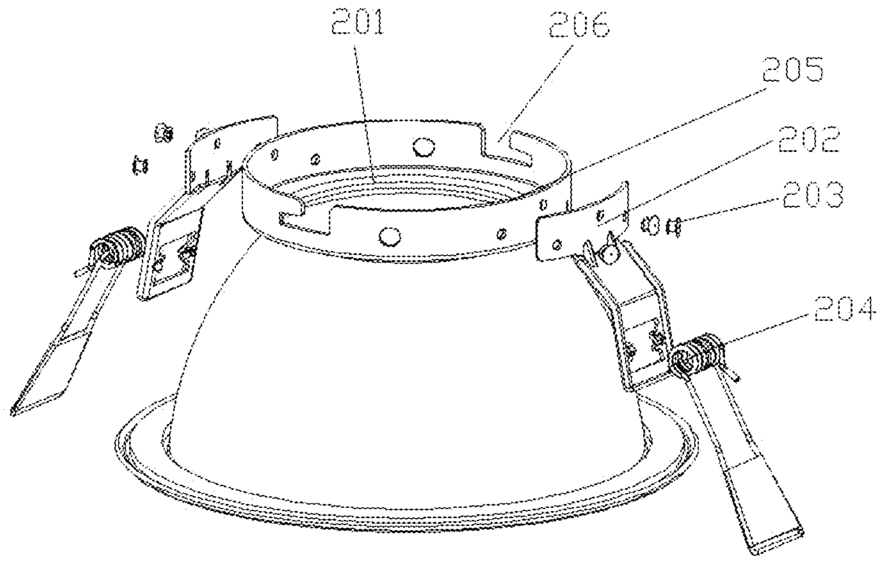
FIG. 4 is an exploded diagram showing a reflector cup assembly.
Figure 5:
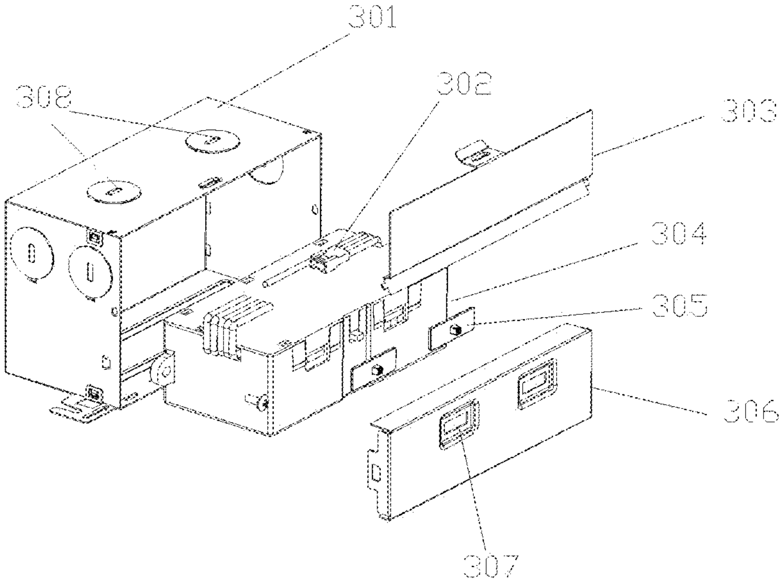
FIG. 5 is an exploded diagram showing a power supply assembly.
Figure 6:
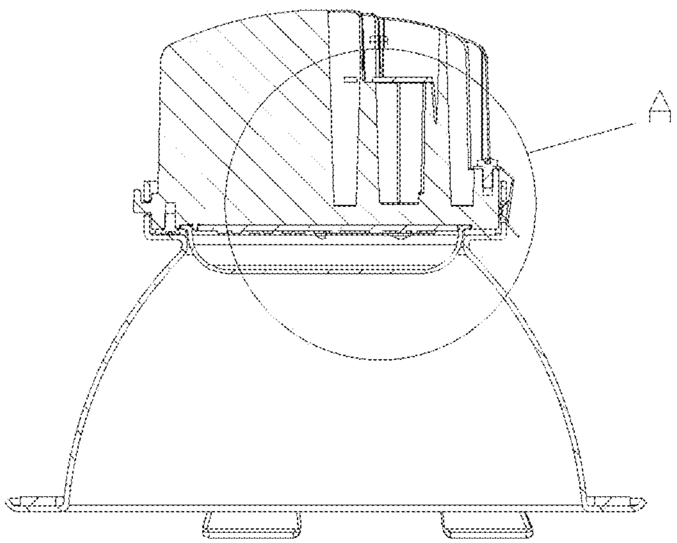
FIG. 6 is a cross-sectional view showing a lamp holder assembly and a power supply assembly.
Figure 7:
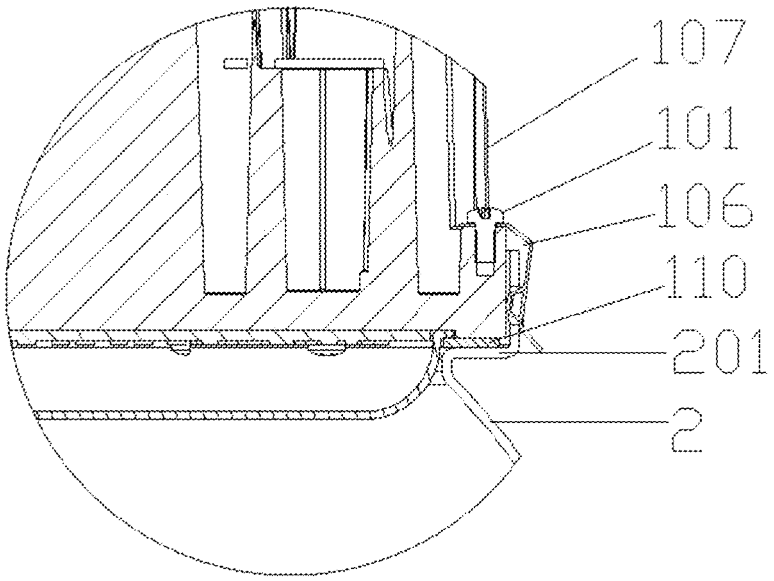
FIG. 7 is an enlarged diagram of a part A shown in FIG. 6.
Figure 8:
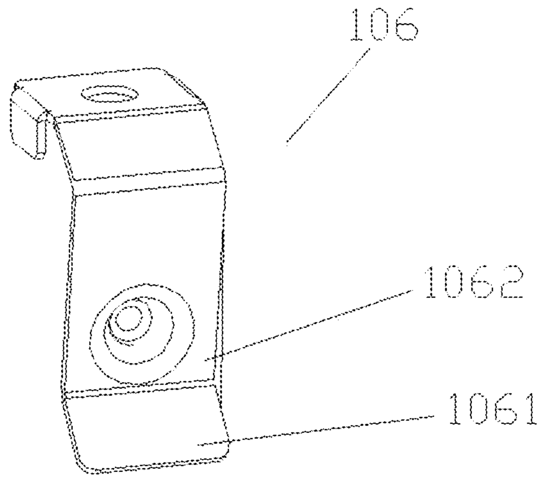
FIG. 8 is a schematic diagram showing an anti-loosening elastic piece.

As shown in FIG. 1 to FIG. 7, a modular LED lamp device includes: a lamp holder assembly 1, where the lamp holder assembly 1 is provided with a heat sink 107, a lamp panel 108 is transversely attached inside the heat sink 107, the lamp panel 108 is fixedly connected to the heat sink 107 through screws 101, a diffusion cover 109 is connected below the lamp panel 108, a pressure ring 110 is provided below the diffusion cover 109, the pressure ring 110 fixes the diffusion cover to the heat sink 107 through screws 101, a connector bracket 103 is mounted on the heat sink 107, a wiring terminal 111 is provided in the connector bracket 103, and a protrusion 112 are provided at a lower part of the heat sink 107; a reflector cup assembly 2, where the reflector cup assembly 2 is provided with a reflector cup platform 201 for supporting the lamp holder assembly 1, the reflector cup platform 201 is closely attached to the lamp holder assembly 1, a reflector cup rim 205 is provided at a top of the reflector cup assembly 1, a slot 206 is formed in the reflector cup rim 205, and the slot 206 is matched with the protrusion 112; and a power supply assembly 3, where the power supply assembly 3 is provided with a power supply box 301, a power supply module 304 is built in the power supply box 301, a connecting terminal 302 is provided on the power supply module 304, and the connecting terminal 302 is connected to the wiring terminal 111.

In this embodiment, a hose connector 104 is connected to the connector bracket 103, a hose 105 is connected to the hose connector 104, a steel wire rope 102 is connected to the hose 105, the steel wire rope 102 is fixed to the heat sink 107 through screws 101, and the wiring terminal 111 is wrapped inside the hose 105.

In this embodiment, an anti-loosening elastic piece 106 is fixedly connected to the heat sink 107 through screws 101, and the anti-loosening elastic piece 106 is provided with a raised structure 1061 for introducing the reflector cup assembly 1 and a bulging structure 1062 for fixing the reflector cup assembly 1.

In this embodiment, a spring bracket 202 is connected to the reflector cup rim 205 through a rivet 203, and a spring 204 is mounted on the spring bracket 202.

In this embodiment, a wiring cover 303 is connected to the power supply box 301 through a bayonet, a DIP switch cover 306 is provided below the wiring cover 303, and DIP switch holes 307 are formed in the DIP switch cover 306.

In this embodiment, a DIP switch 305 is provided on the power supply module 304, and the DIP switch 305 is exposed outside the DIP switch hole 307.

In this embodiment, a plurality of reserve holes 308 for the hose 105 and the wiring terminal 111 to pass through are formed in the power supply box 301.

In this embodiment, there are at least two slots 206 and at least two protrusions 112, and the slots 206 and the protrusions 112 are symmetrically arranged.

According to this device, during specific installation, first, the arc structure of the spring bracket 202 is attached to the reflector cup rim 205 and fixed by the rivet 203, the spring 204 is then mounted on the spring bracket 202, and the assembling of the reflector cup assembly 2 is completed.

Second, the lamp holder assembly 1 is assembled. The lamp panel 108 is transversely attached inside the heat sink 107 and tightened by the screws 101, the diffusion cover 109 is then sleeved with the pressure ring 110, and finally, the pressure ring is fixed to the heat sink 107 by the screws. The connector bracket 103 is mounted in a mounting recess on the heat sink 109 and fixed by the screws 101. The hose 105 and the hose connector 104 are connected to the connector bracket 103, the wiring terminal 111 is arranged at the tail end of a wire in the hose 105, and the steel wire rope 102 is locked on the heat sink through the screws.

The lamp holder assembly 1 is connected to the reflector cup assembly 2, the slot 206 on the reflector cup assembly 2 is connected to the protrusion 112 on the lamp holder assembly 1, and then the anti-loosening elastic piece 106 is locked on the heat sink 107 through the screws 101. Because the anti-loosening elastic piece 106 is provided with the raised structure 1061 and the bulging structure 1062, the raised structure 1061 facilitates the mounting guidance of the reflector cup assembly 2, and the bulging structure 1062 can effectively prevent the reflector cup assembly 2 from loosening. At this time, the inner wall of the reflector cup assembly 2 is closely attached to the outer wall of the lamp holder assembly 1, effectively preventing the reflector cup rim 205 from deforming.

According to on-site installation conditions, one of the reserve holes 308 is removed, the hose 105 passes through the reserve hole 308, the wiring terminal 111 is connected to the connecting terminal 302, and the DIP switches 305 are toggled to adjust the color temperature and power of the lamp. The installation of the lamp is completed.

Finally, it should be noted that the above embodiments are merely provided to explain the technical solutions of the present application, rather than limit the present application. Under the idea of the present application, the above embodiments or technical features in different embodiments may also be combined, the steps may be implemented in any order, and there are many variations in different aspects of the present application described above, which are not provided in detail for the sake of brevity. Although the present application is described in detail with reference to the above embodiments, a person of ordinary skill in the art should understand that they can still modify the technical solutions described in the above embodiments or make equivalent substitutions for some technical features therein, and these modifications or substitutions do not make the essence of corresponding technical solutions depart from the scope of the technical solutions of the embodiments of the present application.

What is claimed is:

1. A modular light emitting diode (LED) lamp device, comprising:

a lamp holder assembly, wherein the lamp holder assembly is provided with a heat sink, a lamp panel is transversely attached inside the heat sink, the lamp panel is fixedly connected to the heat sink through screws, a diffusion cover is connected below the lamp panel, a pressure ring is provided below the diffusion cover, the pressure ring fixes the diffusion cover to the heat sink through screws, a connector bracket is mounted on the heat sink, a wiring terminal is provided in the connector bracket, and a protrusion is provided at a lower part of the heat sink;

a reflector cup assembly, wherein the reflector cup assembly is provided with a reflector cup platform for supporting the lamp holder assembly, the reflector cup platform is closely attached to the lamp holder assembly, a reflector cup rim is provided at a top of the reflector cup assembly, a slot is formed in the reflector cup rim, and the slot is matched with the protrusion; and a power supply assembly, wherein the power supply assembly is provided with a power supply box, a power supply module is built in the power supply box, a connecting terminal is provided on the power supply module, and the connecting terminal is connected to the wiring terminal;

wherein an anti-loosening elastic piece is fixedly connected to the heat sink through screws, and the anti-loosening elastic piece is provided with a raised structure for introducing the reflector cup assembly and a bulging structure for fixing the reflector cup assembly.

* * * * *